United States Patent
Xiong et al.

(10) Patent No.: US 10,957,090 B2
(45) Date of Patent: Mar. 23, 2021

(54) EYE ANIMATED EXPRESSION DISPLAY METHOD AND ROBOT USING THE SAME

(71) Applicant: UBTECH ROBOTICS CORP LTD, Shenzhen (CN)

(72) Inventors: Youjun Xiong, Shenzhen (CN); Ding Peng, Shenzhen (CN); Jing Yang, Shenzhen (CN); Xiaomin Zheng, Shenzhen (CN); Xin Li, Shenzhen (CN); Qingchun Huang, Shenzhen (CN); Xing Xiao, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 16/528,645

(22) Filed: Aug. 1, 2019

(65) Prior Publication Data
US 2020/0098158 A1 Mar. 26, 2020

(30) Foreign Application Priority Data
Sep. 20, 2018 (CN) .......................... 201811100544.X (51) Int. Cl.
*G06T 11/00* (2006.01)
*G06T 13/80* (2011.01)
*G06F 16/58* (2019.01)
*G06F 16/14* (2019.01)
*G06F 16/583* (2019.01)

(52) U.S. Cl.
CPC ............ *G06T 13/80* (2013.01); *G06F 16/156* (2019.01); *G06F 16/583* (2019.01); *G06T 11/001* (2013.01); *G06T 2213/04* (2013.01)

(58) Field of Classification Search
CPC combination set(s) only.
See application file for complete search history.

(56) References Cited

U.S. PATENT DOCUMENTS

| | | | |
|---|---|---|---|
| 2016/0199977 A1* | 7/2016 | Breazeal | B25J 9/1694 700/246 |
| 2018/0117762 A1* | 5/2018 | Earwood | B25J 11/0015 |
| 2019/0213382 A1* | 7/2019 | Zhang | A61B 1/04 |

* cited by examiner

*Primary Examiner* — Wesner Sajous (57) ABSTRACT

The present disclosure provides an eye animated expression display method. The method includes: receiving an instruction for displaying an eye animated expression; parsing a JSON file storing the eye animated emoticon to obtain a parsing result; and displaying the eye animated emoticon on the eye display screen based on the parsing result. The present disclosure further provides a robot. In the above-mentioned manner, the present disclosure is capable of improving the interactive performance of the eyes of the robot while reducing the space for storing eye animated expressions.

14 Claims, 6 Drawing Sheets

EYE ANIMATED EXPRESSION DISPLAY METHOD AND ROBOT USING THE SAME

TRAVERSE REFERENCE TO RELATED APPLICATION PROGRAMS

This application claims priority to Chinese Patent Application No. CN 201811100544.X, filed Sep. 20, 2018, which is hereby incorporated by reference herein as if set forth in its entirety.

BACKGROUND

1. Technical Field

The present disclosure relates to robot technology, and particularly to an eye animated expression display method and a robot using the same.

2. Description of Related Art

The eyes of a robot can be a display screen which represents the eye expressions of the robot by displaying different images according to different states, so as to realize the interaction with the user. However, there are few types of images for expressing eye expressions, which are quite different from the eye expressions of real human eyes, and the switching between different eye expressions is very abrupt. Since the eye expressions of the robot are not good, the interactive performance is also not good.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

The present disclosure will be described in detail in conjunction with the drawings and embodiments as follows. The following embodiments which are not conflicted may be combined with each other.

Figure 1:
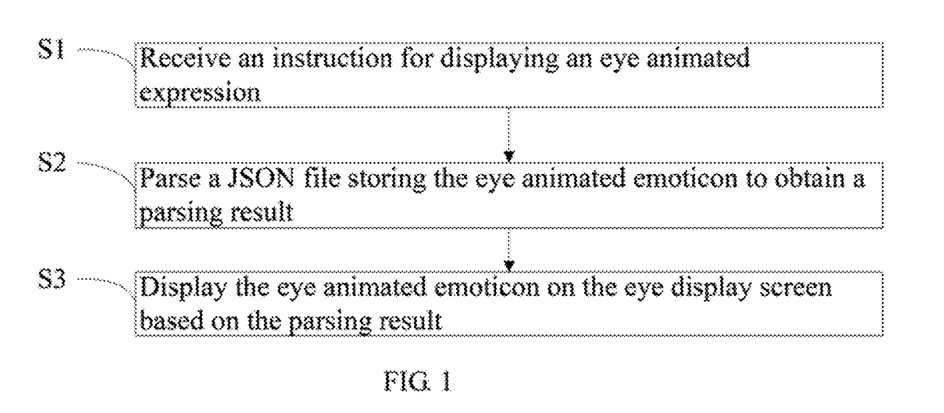
FIG. 1 is a flow chart of an eye animated expression display method according to an embodiment of the present disclosure.

FIG. 1 is a flow chart of an eye animated expression display method according to an embodiment of the present disclosure. In this embodiment, an eye animated expression display method for a robot having an eye display screen is provided. The method is a computer-implemented method executable for a processor, which may be implemented through and applied to an eye animated expression display apparatus shown in FIG. 3 that is for a robot having an eye display screen or a robot shown in FIG. 4 that has an eye display screen, or implemented through a computer readable storage medium shown in FIG. 5. As shown in FIG. 1, the method includes the following steps.

S1: receiving an instruction for displaying an eye animated expression.

The instruction to display the eye animated expression may be sent in response to instruction(s) of the interaction of a user of the robot, or may be sent actively without he interaction of the user, for example, sending the instruction to display the eye animated expression by the robot itself when the robot is in standby.

S2: parsing a JSON (JavaScript object notation) file storing the eye animated emoticon to obtain a parsing result.

JSON is a lightweight data exchange format, which is based on a subset of ECMAScript (a scripting-language specification formulated by the European Computer Manufacturers Association) that stores and represents data in a text format that is completely independent of programming languages, which is easy for people to read and write, while is also easy for machines to parse and generate.

Figure 2A:
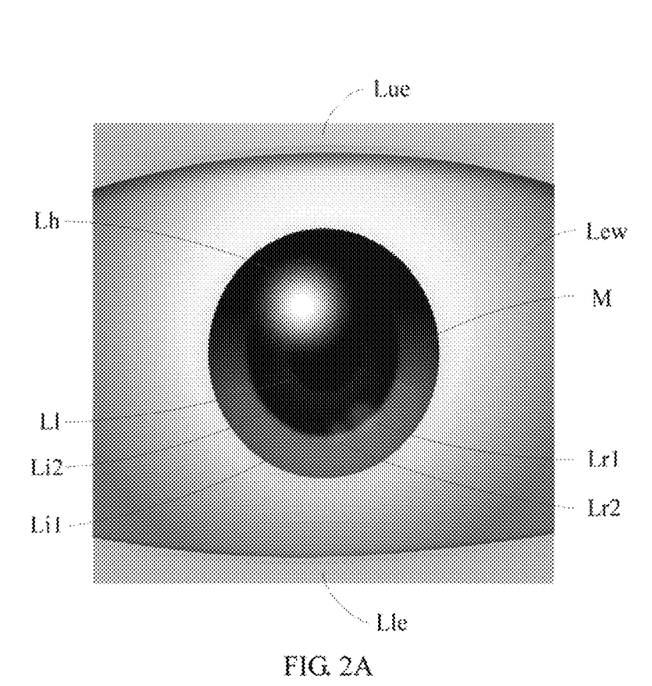
FIG. 2A is a schematic diagram of layers of an eye animated expression according to the embodiment of FIG. 1.
Figure 2B:
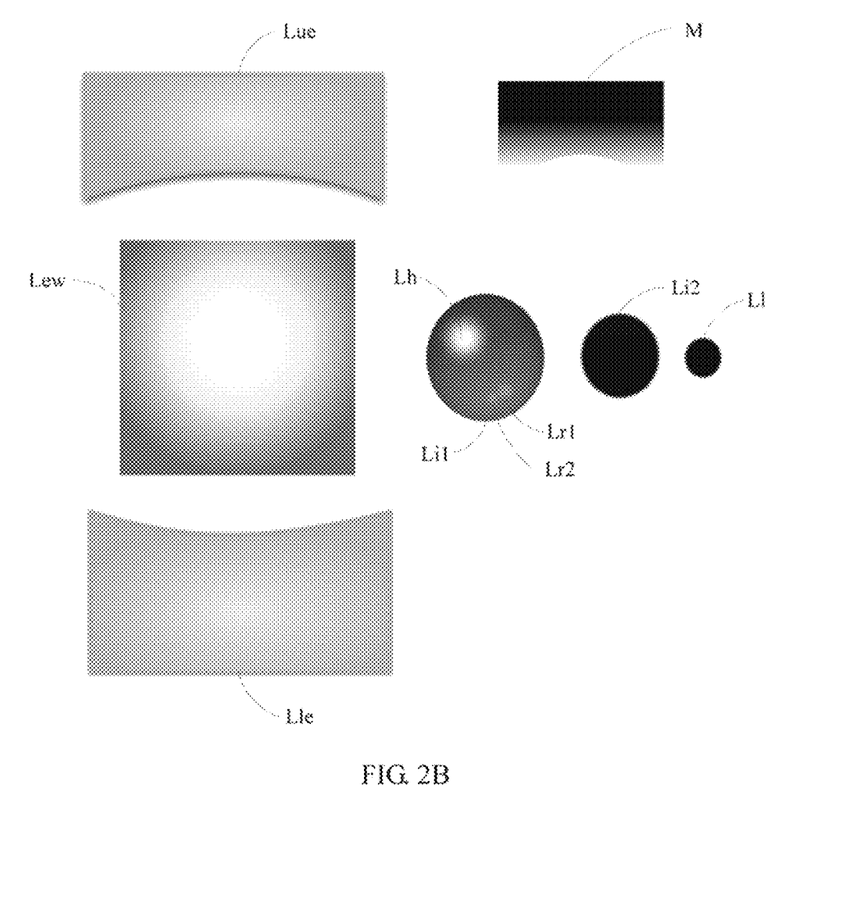
FIG. 2B is an exploded view of the layers of FIG. 2A.

The eye animated emoticon includes a plurality of layers. The eye animated emoticon is used to represent eye expressions of the robot, and the layers can correspond to multiple parts that composite the eye. FIG. 2A is a schematic diagram of layers of an eye animated expression according to the embodiment of FIG. 1; and FIG. 2B is an exploded view of the layers of FIG. 2A. As shown in FIG. 2A and FIG. 2B, in one embodiment, the plurality of layers may include an upper eyelid layer $Lue$, a lower eyelid layer $L1e$, an eye white layer $Lew$, a first iris layer $Li1$, a second iris layer $Li2$, a lens layer $L1$, a first reflector layer $Lr1$, a second reflector layer $Lr2$, and a highlight layer $Lh$. In addition to the above-mentioned layers, the eye animated emoticon may further include a mask M for covering other parts of the eye display screen except the layers.

The JSON file includes a plurality of key frames and a plurality of change parameters. The JSON file is parsed to obtain the key frames and the change parameters to take as the parsing result.

Each of the key frames refers to a frame in which a key motion in the process of the layer moves or changes. The frame(s) between the key frames can be referred to as transition frame(s). Each layer of the transition frame can be generated based on the adjacent key frames and the change parameters. The first and last frames of an eye animated emoticon are generally key frames.

The change parameters include a change model of the layer. The change model includes a graphical trajectory model and/or a graphical velocity model. The graphical trajectory model represents that how a graphic in the layer to move along a trajectory on the screen, for example, through a linear motion, a circular motion, or the like. The graphical velocity model represents the velocity change of the graphic in the layer to move along the trajectory, for example, through a uniform motion or accelerating first and then decelerating. The graphical trajectory model/graphical velocity model can be set to a default value, for example, the graphical trajectory model can be set to the default value of a linear motion, while the graphics velocity model can be set to the default value of a uniform motion. If the graphical trajectory model/graphical velocity model is at the default value, it can be omitted.

Each of the key frames includes graphic data of at least one of the layers, and the graphic data includes display parameter(s) of at least one graphic in the corresponding layer. The display parameter(s) include at least one of a shape, a position, a color, and a transparency of the graphic. Since the layers in the eye animated emoticon may not move/change at the same time, and the move/change is not necessarily synchronized, there may be the case that that the key frames in the process of the move/change of certain layers are not the key frames of other layers. In the key frames for only a part of the layers, they may not include the graphic data of other layers that are not taking them as the key frames.

S3: displaying the eye animated emoticon on the eye display screen based on the parsing result.

In one embodiment, a plurality of eye animation frames are generated using the key frames and the change parameters and the eye animation frames are sequentially displayed on the eye display screen. In which, the eye animation frames include the transition frame(s) between the key frames.

Each of the eye animation frames is composed of a plurality of the layers. Different layers can have different stacking order, and the upper layer will cover the lower layer.

Each of the layers is drawn using the corresponding graphic data. If a current eye animation frame is a key frame, the layer can be directly drawn using the parsed graphic data. If the current eye animation frame is not the key frame, or the eye animation frame is the key frame but does not include the graphic data of the layer, the graphic data of the layer is obtained using the graphic data of the layer in the adjacent key frames and an interpolator corresponding to the change parameters. For each layer, the adjacent key frames refer to two key frames of the graphic data that are before and after the current eye animation frame and include the layer. For the same eye animation frame, the adjacent key frames for different layers may be different.

Through the implementation of this embodiment, animations are used to express the expression of the eyes of the robot, which is more lively and vivid than using images, which improves the interactive performance of the eyes of the robot. At the same time, by using the file in JSON format to store the eye animated expressions, the space for storing the eye animated expressions can be effectively reduced.

For example, the animated emoticon file in JSON format includes 7 layers of an upper eyelid layer, a lower eyelid layer, an eye white layer, an iris layer, a lens layer, a reflector layer, and a highlight layer, and a motion of the eye expression to be performed is that the eyes are moved from the middle to the left and back to the middle, and then raised toward the sky and back to the middle. In which, the eye white layer, the iris layer, the lens layer, the reflector layer, and the high-light layer are synchronous moved, which are collectively referred to as an eyeball layer group for convenience of description.

The first frame obtained by parsing the JSON file is the initial key frame of the eye being at the middle; the second key frame is the a-th frame of the eye being at an end of the left movement; the third key frame is the b-th frame of the eye being back to the middle; the fourth key frame is the c-th frame of the eye being raised to a highest point; and the fifth key frame is the d-th frame, that is, the last frame of the eye being back to the middle.

When the eyes are moved from the middle to the left and back to the middle, that is, the upper eyelid and the lower eyelid are stationary and the eyeball layer group is moved in the process from the first frame to the b-th frame, and all the layers are moved in the process from the b-th frame to the d-th frame-.

The first frame includes the graphic data of all the layers, the a-th frame only includes the graphic data of the eyeball layer group, and the b-th, c-th, and d-th frames all include the graphic data of all the layers. The graphic data of the upper eyelid layer and the lower eyelid laye of each frame (including the a-th frame) between the first frame and the b-th frame is obtained based on the graphic data of the upper eyelid layer and the lower eyelid layer of the first frame and the b-th frame and the change parameters. In the transition frame(s) between the first frame and the a-th frame, the graphic data of the eyeball layer group is calculated based on the graphic data of the eyeball layer group of the first frame and the a-th frame and the interpolator of the corresponding change parameters. In the transition frame(s) between the a-th frame and the b-th frame, the graphic data of the eyeball layer group is calculated based on the graphic data of the eyeball layer group of the a-th frame and the b-th frame and the interpolator of the corresponding change parameters. In the transition frame(s) between the b-th frame and the c-th frame, the graphic data of each layer is calculated based on the graphic data of the corresponding layer(s) of the b-th frame and the c-th frame and the interpolator of the change parameters. In the transition frame(s) between the c-th frame and the d-th frame, the graphic data of each layer is calculated based on the graphic data of the corresponding layer(s) of the c-th and d-th frames and the interpolator of the change parameters.

The calculation process of the graphic data is to be illustrated by taking a position parameter of the upper eyelid layer that is in the transition frame e between the c-th frame and the d-th frame as an example. The graphical velocity model of the upper eyelid layer between the c-th frame and the d-th frame is used to determine a motion velocity interpolator $x=f(n)$ of the upper eyelid layer, where n represents the frame number and x represents an equivalent time calculated using the motion velocity interpolator; a position parameter of the upper eyelid layer in the c-th and d-th frames and the graphical trajectory model of the upper eyelid layer are used to determine a motion track interpolator $y=g(x)$ of the upper eyelid layer, where y represents the position and x represents the equivalent time. n=e is substituted into the motion velocity interpolator to obtain $x_e=f(e)$, and then $x_e$ is substituted into the motion trajectory interpolator to obtain $y_e=g(x_e)$, where $y_e$ is the position parameter of the upper eyelid layer in the transition frame e.

For example, for an interpolator $y=\cos((t+1)\pi)/2+0.5$ (which represents a change relationship between the movement process and the time) that accelerates first and then decelerates, where t is the time in a range of [0, 1], and y is the movement process of a certain parameter of an eye animation frame in a range of [0, 1]. Assuming that a start value and an end value of the parameter are a and b, respectively, then the value of the intermediate change is $a+y*(b-a)$, where y is the process calculated by the above-mentioned interpolator. Suppose that an animation is performed in 5 seconds, and the time from the beginning to the end of the animation is divided by 5 seconds to obtain t. Since the time is linear and the movement process calculated through the above-mentioned interpolator is changed in a curve manner, the intermediate parameter of the animation that are calculated through the above-mentioned value is also changed in a curve manner. It is parsed in JSON format to obtain the layers of the eye animated emoticon, and then animated images such as AE (After Effect) animated images are generated in a reverse manner and projected onto the eye display screen.

It can draw all the layers of an animation frame and combine them into the animation frame, or can also draw multiple layers of multiple animation frames at once and respectively combine the layers in each of the same animation frames, which is not limited herein.

Figure 3:
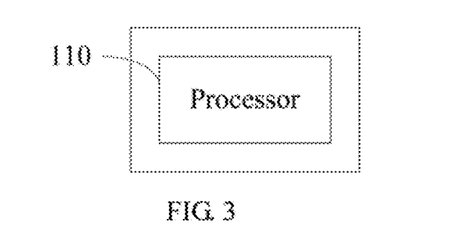
FIG. 3 is a schematic block diagram of the structure of an eye animated expression display apparatus according to an embodiment of the present disclosure.

FIG. 3 is a schematic block diagram of the structure of an eye animated expression display apparatus according to an embodiment of the present disclosure. As shown in FIG. 3, in this embodiment, an eye animated expression display apparatus is provided. The apparatus includes a processor 110. Although only one processor 110 is shown in the figure, its actual number can be more than 1. The processor 110 can operate alone or in a cooperative manner.

The processor 110 controls the operation of the eye animated expression display apparatus. The processor 110 may also be referred to as a central processing unit (CPU). The processor 110 may be an integrated circuit chip with the capability of signal sequence processing. The processor 110 may also be a general purpose processor, a digital signal processor (DSP), an application specific integrated circuit (ASIC), a field-programmable gate array (FPGA), or other programmable logic device, a discrete gate, a transistor logic device, and a discrete hardware component. The general purpose processor may be a microprocessor, or the processor may also be any conventional processor.

The processor 110 is configured to execute instructions to implement any of the embodiments of the eye animated expression display method of the present disclosure and a non-conflicting combination of the embodiments.

Figure 4:
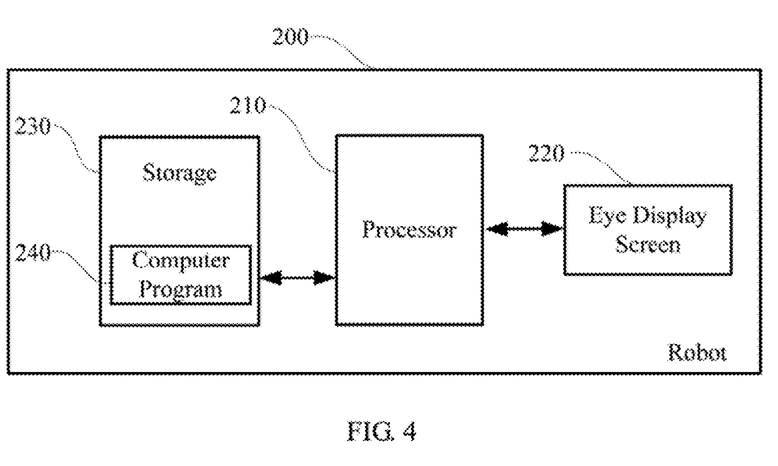
FIG. 4 is a schematic block diagram of the structure of a robot according to an embodiment of the present disclosure.

FIG. 4 is a schematic block diagram of the structure of a robot according to an embodiment of the present disclosure. As shown in FIG. 4, in this embodiment, a robot 200 is provided. The robot 200 includes a processor 210, an eye display screen 220, a storage 230, and a computer program 240 stored in the storage 230 and executable on the processor 210, for example, an eye animated expression display program. In which, the display screen 220 and the storage 230 are coupled to the processor 210.

The processor 210 controls the operation of the robot. The processor 210 may also be referred to as a central processing unit (CPU). The processor 210 may be an integrated circuit chip with the capability of signal sequence processing. The processor 210 may also be a general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The processor 210 is configured to execute instructions to implement any of the embodiments of the eye animated expression display method of the present disclosure and a non-conflicting combination of the embodiments.

Figure 5:
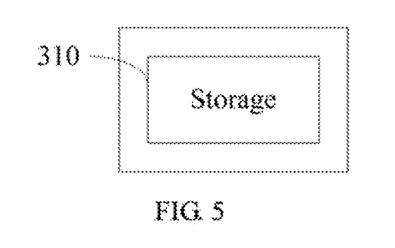
FIG. 5 is a schematic block diagram of the structure of a computer readable storage medium according to an embodiment of the present disclosure.

FIG. 5 is a schematic block diagram of the structure of a computer readable storage medium according to an embodiment of the present disclosure. As shown in FIG. 5, in this embodiment, a computer readable storage medium is provided. The computer readable storage medium includes a storage 310 storing with instructions. When being executed, the instructions implement any of the embodiments of the eye animated expression display method of the present disclosure and a non-conflicting combination of the embodiments.

The storage 310 may include a read-only memory (ROM), a random access memory (RAM), a flash memory, a hard disk, an optical disk, and the like.

In the embodiments provided by the present disclosure, it should be understood that the disclosed method and apparatus may be implemented in other manners. For example, the above-mentioned apparatus embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

The integrated unit can be stored in a computer-readable storage medium if it is implemented in the form of a software functional unit and sold or utilized as a separate product. Based on this understanding, the technical solution of the present disclosure, either essentially or in part, contributes to the prior art, or all or a part of the technical solution can be embodied in the form of a software product. The software product is stored in a storage medium, which includes a number of instructions for enabling a computer device (which can be a personal computer, a server, a network device, etc.) or a processor to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented eye animated expression display method for a robot having an eye display screen, comprising executing on a processor of the robot the steps of:

receiving an instruction for displaying an eye animated expression;

parsing a JavaScript object notation (JSON) file storing the eye animated emoticon to obtain a parsing result; and displaying the eye animated emoticon on the eye display screen based on the parsing result;

wherein the eye animated emoticon comprises a plurality of layers, and the JSON file comprises a plurality of key frames and a plurality of change parameters; each of the key frames comprises graphic data of at least one of the layers, the graphic data comprises one or more display parameters of at least one graphic in the corresponding layer, and the change parameters comprises a change model of the layer.

2. The method of claim 1, wherein the step of parsing the JSON file storing the eye animated emoticon to obtain the parsing result comprises:

parsing the JSON file to obtain the key frames and the change parameters to take as the parsing result;

the step of displaying the eye animated emoticon on the eye display screen based on the parsing result comprises:

generating a plurality of eye animation frames based on the key frames and the change parameters and sequentially displaying the eye animation frames on the eye display screen.

3. The method of claim 2, wherein each of the eye animation frames is composed of a plurality of the layers, and each of the layers is drawn based on the corresponding graphic data.

4. The method of claim 3, wherein the graphic data of the layer is obtained based on the graphic data of the layer in the adjacent key frames and an interpolator corresponding to the change parameters, in response to the eye animation frame being not the key frame or the eye animation frame being the key frame but does not comprise the graphic data of the layer.

5. The method of claim 1, wherein the one or more display parameters comprise at least one of a shape, a position, a color, and a transparency of the graphic.

6. The method of claim 1, wherein the change model comprises a graphical trajectory model and/or a graphical velocity model.

7. The method of claim 1, wherein the layers comprises an upper eyelid layer, a lower eyelid layer, an eye white layer, an iris layer, a lens layer, a reflector layer, and a highlight layer.

8. A robot, comprising:
an eye display screen;
a memory;
a processor; and
one or more computer programs stored in the memory and executable on the processor, wherein the one or more computer programs comprise:
instructions for receiving an instruction for displaying an eye animated expression;
instructions for parsing a JavaScript object notation (JSON) file storing the eye animated emoticon to obtain a parsing result; and
instructions for displaying the eye animated emoticon on the eye display screen based on the parsing result;
wherein the eye animated emoticon comprises a plurality of layers, and the JSON file comprises a plurality of key frames and a plurality of change parameters; each of the key frames comprises graphic data of at least one of the layers, the graphic data comprises one or more display parameters of at least one graphic in the corresponding layer, and the change parameters comprises a change model of the layer.

9. The robot of claim 8, wherein the instructions for parsing the JSON file storing the eye animated emoticon to obtain the parsing result comprise:

instructions for parsing the JSON file to obtain the key frames and the change parameters to take as the parsing result;

the instructions for displaying the eye animated emoticon on the eye display screen based on the parsing result comprise:

instructions for generating a plurality of eye animation frames based on the key frames and the change parameters and sequentially displaying the eye animation frames on the eye display screen.

10. The robot of claim 9, wherein each of the eye animation frames is composed of a plurality of the layers, and each of the layers is drawn based on the corresponding graphic data.

11. The robot of claim 10, wherein the graphic data of the layer is obtained based on the graphic data of the layer in the adjacent key frames and an interpolator corresponding to the change parameters, in response to the eye animation frame being not the key frame or the eye animation frame being the key frame but does not comprise the graphic data of the layer.

12. The robot of claim 8, wherein the one or more display parameters comprise at least one of a shape, a position, a color, and a transparency of the graphic.

13. The robot of claim 8, wherein the change model comprises a graphical trajectory model and/or a graphical velocity model.

14. The robot of claim 8, wherein the layers comprises an upper eyelid layer, a lower eyelid layer, an eye white layer, an iris layer, a lens layer, a reflector layer, and a highlight layer.

* * * * *